US010063319B2

(12) United States Patent
Stapleton et al.

(10) Patent No.: US 10,063,319 B2
(45) Date of Patent: *Aug. 28, 2018

(54) HYBRID DATA TRANSPORT FOR A VIRTUALIZED DISTRIBUTED ANTENNA SYSTEM

(71) Applicant: Dali Systems Co. Ltd., George Town, Grand Cayman (KY)

(72) Inventors: Shawn Patrick Stapleton, Vancouver (CA); Sasa Trajkovic, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,121

(22) Filed: Dec. 19, 2016

(65) Prior Publication Data

US 2017/0104538 A1     Apr. 13, 2017

Related U.S. Application Data

(63) Continuation of application No. 13/777,185, filed on Feb. 26, 2013, now Pat. No. 9,537,572.

(Continued)

(51) Int. Cl.
*H04J 14/00* (2006.01)
*H04B 10/2575* (2013.01)
(Continued)

(52) U.S. Cl.
CPC ....... *H04B 10/25754* (2013.01); *H04B 10/27* (2013.01); *H04W 16/26* (2013.01)

(58) Field of Classification Search
CPC ........ H04B 10/25753; H04B 10/25758; H04B 10/27; H04W 16/24; H04L 5/0032
(Continued)

(56) References Cited

U.S. PATENT DOCUMENTS 5,627,879 A      5/1997  Russell et al.
6,785,558 B1 *   8/2004  Stratford ............... H04L 1/0625
                                                           455/522

(Continued)

FOREIGN PATENT DOCUMENTS

CN           1524390          8/2004
CN         101237631          8/2008

(Continued)

OTHER PUBLICATIONS

U.S. Appl. No. 13/777,185, "Final Office Action", dated Sep. 9, 2015, 8 pages.

(Continued)

*Primary Examiner* — Hanh Phan
(74) *Attorney, Agent, or Firm* — Kilpatrick Townsend & Stockton LLP

(57) ABSTRACT

A system for data transport in a Distributed Antenna System (DAS) includes a plurality of remote Digital Access Units (DAUs) located at a Remote location. The plurality of remote DAUs are coupled to each other and operable to transport digital signals between the plurality of remote DAUs. The system also includes a plurality of central hubs. Each of the plurality of central hubs is in communication with one of the remote DAUs using an electrical communications path. The system further includes a plurality of transmit/receive cells. Each of the plurality of transmit/receive cells includes a plurality of remote hubs. Each of the remote hubs in one of the plurality of transmit/receive cells is in communication with one of the plurality of central hubs using an optical communications path.

17 Claims, 12 Drawing Sheets

Related U.S. Application Data

(60) Provisional application No. 61/604,341, filed on Feb. 28, 2012.

(51) Int. Cl.
*H04B 10/27* (2013.01)
*H04W 16/26* (2009.01)

(58) Field of Classification Search
USPC ... 398/115, 116, 117, 66, 67, 68, 69, 70, 71, 398/72, 76, 79, 98, 99, 100, 45, 46, 48, 398/49; 370/328, 329, 338, 352, 312, 370/389, 392, 468; 455/445, 422, 424, 455/450, 562.1, 509
See application file for complete search history.

(56) References Cited

U.S. PATENT DOCUMENTS

| | | | |
|---|---|---|---|
| 6,865,390 B2 | 3/2005 | Goss et al. | |
| 7,013,087 B2 | 3/2006 | Suzuki et al. | |
| 7,349,634 B2 | 3/2008 | Sasai et al. | |
| 8,098,990 B2 * | 1/2012 | Hu | H04J 14/0282 370/352 |
| 9,025,956 B2 * | 5/2015 | Stapleton | H04B 10/27 370/328 |
| 9,112,611 B2 | 8/2015 | Palanisamy et al. | |
| 9,537,572 B2 * | 1/2017 | Stapleton | H04B 10/25754 |
| 9,621,971 B2 * | 4/2017 | Stapleton | H04B 10/27 |
| 2002/0187809 A1 | 12/2002 | Mani et al. | |
| 2007/0008939 A1 | 1/2007 | Fischer | |
| 2007/0177552 A1 | 8/2007 | Wu et al. | |
| 2008/0232305 A1 * | 9/2008 | Oren | H04B 7/022 370/328 |
| 2009/0170543 A1 | 7/2009 | Mostafa et al. | |
| 2010/0278530 A1 | 11/2010 | Kummetz et al. | |
| 2011/0096736 A1 | 4/2011 | Kwon et al. | |
| 2011/0135308 A1 | 6/2011 | Tarlazzi et al. | |
| 2013/0017863 A1 | 1/2013 | Kummetz et al. | |
| 2013/0195467 A1 | 8/2013 | Schmid et al. | |
| 2014/0037292 A1 | 2/2014 | Stapleton et al. | |
| 2014/0072299 A1 | 3/2014 | Stapleton et al. | |
| 2014/0126914 A1 * | 5/2014 | Berlin | H04B 7/0413 398/116 |
| 2017/0303019 A1 | 10/2017 | Stapleton et al. | |

FOREIGN PATENT DOCUMENTS

| | | |
|---|---|---|
| CN | 101283551 | 10/2008 |
| CN | 101340647 | 1/2009 |
| CN | 101444121 | 5/2009 |
| CN | 101453799 | 6/2009 |
| CN | 101547447 | 9/2009 |
| CN | 102098080 | 6/2011 |
| EP | 1713290 | 10/2006 |
| JP | 2006094446 | 4/2006 |
| JP | 2007529926 | 10/2007 |
| WO | 2004054290 | 6/2004 |
| WO | 2006102918 | 10/2006 |

OTHER PUBLICATIONS

U.S. Appl. No. 13/777,185, "Non-Final Office Action", dated Feb. 26, 2016, 7 pages.
U.S. Appl. No. 13/777,185, "Non-Final Office Action", dated Feb. 18, 2015, 8 pages.
U.S. Appl. No. 13/777,185, "Notice of Allowance", dated Aug. 29, 2016, 5 pages.
Japanese Patent Application No. JP2014-554989, "Notice of Allowance", dated Jul. 11, 2017, 3 pages.

* cited by examiner

HYBRID DATA TRANSPORT FOR A VIRTUALIZED DISTRIBUTED ANTENNA SYSTEM

CROSS-REFERENCES TO RELATED APPLICATIONS

This application is a continuation of U.S. patent application Ser. No. 13/777,185 filed Feb. 26, 2013; which claims priority to U.S. Provisional Patent Application No. 61/604,341, filed on Feb. 28, 2012, the disclosures of each are hereby incorporated by reference in their entirety for all purposes.

BACKGROUND OF THE INVENTION

Wireless communication systems employing Distributed Antenna Systems (DAS) are available. A DAS typically includes one or more host units, optical fiber cable or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in wireless communications systems, a need exists for improved methods and systems related to wireless communications.

SUMMARY OF THE INVENTION

The present invention generally relates to wireless communication systems employing Distributed Antenna Systems (DAS) as part of a distributed wireless network. More specifically, the present invention relates to a DAS utilizing a software configurable radio (SCR). In a particular embodiment, the present invention has been applied to the use of coupled remote Digital Access Units. The methods and systems described herein are applicable to a variety of communications systems including systems utilizing various communications standards.

Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a lunch room or cafeteria location in the building. At that time, a large number of subscribers have moved away from their offices and usual work areas. It's likely that during lunchtime, there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

According to an embodiment of the present invention, a system for data transport in a Distributed Antenna System is provided. The system includes a plurality of remote DAUs located at a Remote location. The plurality of remote DAUs are coupled to each other and operable to transport signals between the plurality of remote DAUs. The system also includes a plurality of central hubs. Each of the plurality of central hubs are in communication with one of the remote DAUs using an electrical communications path. The system further includes a plurality of transmit/receive cells. Each of the plurality of transmit/receive cells includes a plurality of remote hubs. Each of the remote hubs in one of the plurality of transmit/receive cells is in communication with one of the plurality of central hubs using an optical communications path (e.g., an optical fiber, which is also referred to as an optical cable and is operable to support both digital and analog signals (i.e., RF over fiber)).

According to another embodiment of the present invention, a system for data transport in a Distributed Antenna System is provided. The system includes a plurality of remote DAUs located at a Remote location. The plurality of remote DAUs are coupled to each other and operable to transport signals between the plurality of remote DAUs. The system also includes a central hub in communication with each of the remote DAUs using a plurality of electrical communications paths (e.g., an RF cable suitable for transporting analog signals) and a plurality of transmit/receive cells. Each of the plurality of transmit/receive cells includes a plurality of remote hubs. Each of the remote hubs is in communication with the central hub using one or more optical communications paths.

According to an embodiment of the present invention, a system for routing signals in a Distributed Antenna System (DAS) is provided. The system includes a plurality of Base Transceiver Stations (BTS), each having one or more sectors and a plurality of BTS RF connections, each being coupled to one of the one or more sectors. The system also includes a plurality of local Digital Access Units (DAUs) located at a Local location. Each of the plurality of local DAUs is coupled to each other, operable to route signals between the plurality of local DAUs, and coupled to at least one of the plurality of BTS RF connections. The system further includes a plurality of remote DAUs located at a Remote location. The plurality of remote DAUs are coupled to each other and operable to transport signals between the plurality of remote DAUs. The plurality of local DAUs can be coupled via at least one of Ethernet cable, Optical Fiber, Microwave Line of Sight Link, Wireless Link, or Satellite Link.

The plurality of local DAUs can be connected to the plurality of remote DRUs via at least one DWDM and at least one optical fiber. The plurality of remote DAUs can be coupled via at least one of Ethernet cable, Optical Fiber, Microwave Line of Sight Link, Wireless Link, or Satellite Link. In an embodiment, the plurality of remote DAUs include one or more Optical interfaces or one or more RF interfaces. In another embodiment, the plurality of remote DAUs include one or more Optical interfaces. As an example, the one or more Optical interfaces can include an optical input and an optical output. In some embodiments, the system also includes a server coupled to each of the plurality of remote DAUs. A single DAU port is connected to a plurality of BTSs in some implementations.

According to another embodiment of the present invention, a system for routing signals in a DAS is provided. The system includes a plurality of local Digital Access Units (DAUs) located at a Local location. The plurality of local DAUs are coupled to each other and operable to route signals between the plurality of local DAUs. The system also includes a plurality of remote Digital Access Units (DAUs) located at a Remote location coupled to each other and operable to transport signals between the remote DAUs and each other and a plurality of Base Transceiver Stations (BTS). The system further includes a plurality of Base Transceiver Station sector RF connections coupled to the plurality of local DAUs and operable to route signals between the plurality of local DAUs and the plurality of Base Transceiver Stations sector RF connections and a plurality of DRUs connected to a plurality of remote DAUs via at least one of a Ethernet cable, Optical Fiber, RF Cable, Microwave Line of Sight Link, Wireless Link, or Satellite Link.

According to an alternative embodiment of the present invention, a system for routing signals in a DAS is provided. The system includes a first BTS having a plurality of sectors and a second BTS having a plurality of sectors. Each of the plurality of sectors of the first BTS includes an RF port operable to receive an RF cable. Each of the plurality of sectors of the second BTS includes an RF port operable to receive an RF cable. The system also includes a first local DAU located at a Local location. The first local DAU is connected to an RF port of a first sector of the first BTS through an RF cable and an RF port of a first sector of the second BTS through an RF cable. The system further includes a second local DAU located at a Local location. The second local DAU is connected to an RF port of a second sector of the first BTS through an RF cable and an RF port of the second sector of the second BTS through an RF cable. Additionally, the system includes a communications media connecting the first local DAU and the second local DAU, a mux/demux coupled to the first local DAU and the second local DAU, a network connection between the mux/demux and a second mux/demux, and a plurality of remote DAUs located at a Remote location and connected to the second mux/demux. The plurality of remote DAUs are coupled to each other and to a server.

The plurality of local DAUs can be connected to the plurality of remote DRUs via at least one DWDM and at least one optical fiber. In some implementations, the plurality of remote DAUs are coupled via at least one of Ethernet cable, Optical Fiber, Microwave Line of Sight Link, Wireless Link, or Satellite Link. The plurality of remote DAUs can include one or more Optical interfaces or one or more RF interfaces. The one or more Optical interfaces can include an optical input and an optical output. In a specific embodiment, the system also includes a server coupled to each of the plurality of remote DAUs. In an embodiment, a single DAU port is connected to a plurality of BTSs.

Numerous benefits are achieved by way of the present invention over conventional techniques. For instance, embodiments of the present invention can virtually transport the hotel base stations to a remote location, which may be a considerable distance from the physical location (e.g., kilometers of separation). Additionally, embodiments enable the routing capacity at the remote location. These and other embodiments of the invention along with many of its advantages and features are described in more detail in conjunction with the text below and attached figures.

DETAILED DESCRIPTION OF SPECIFIC EMBODIMENTS

Figure 1:
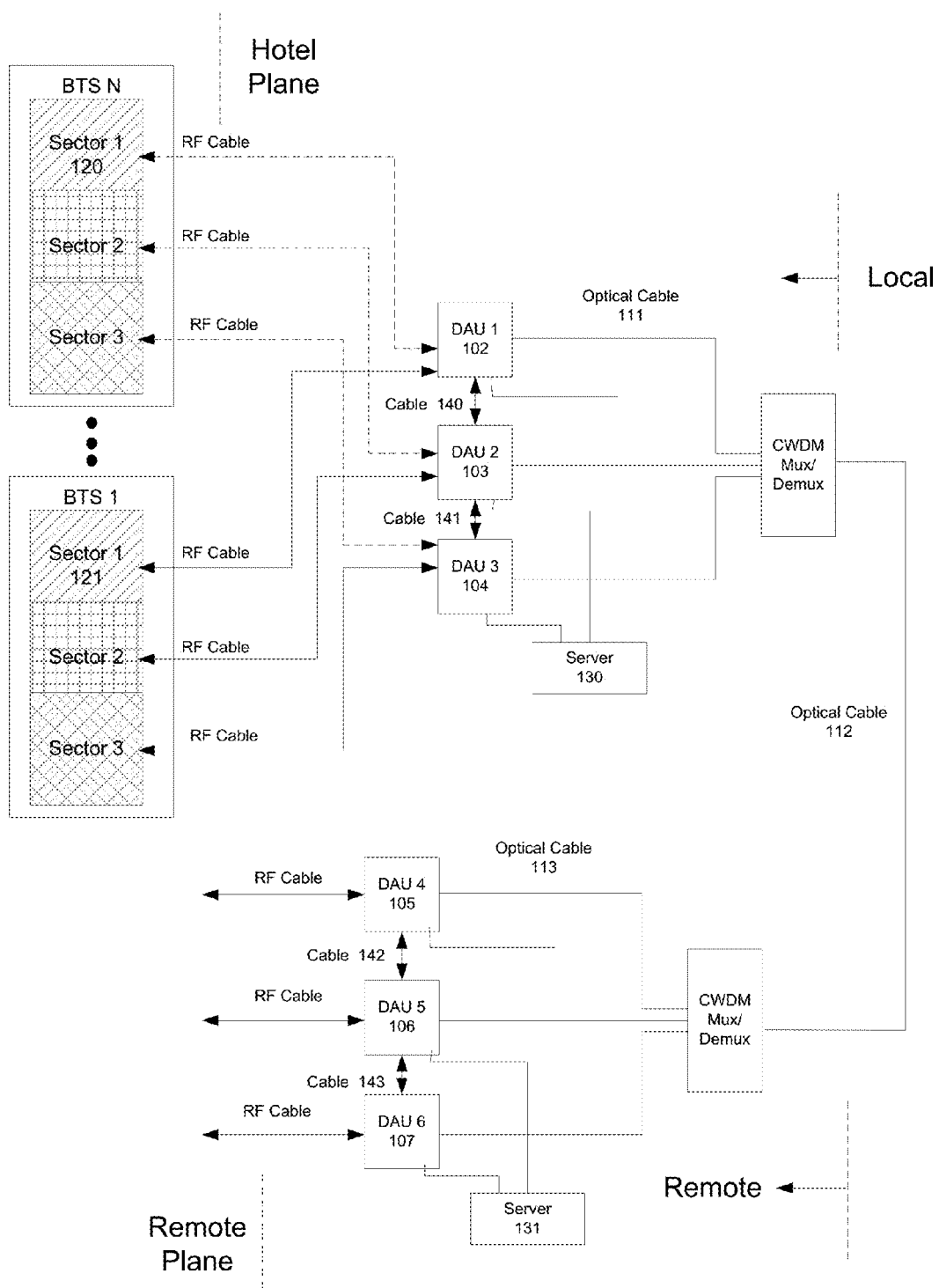
FIG. 1 is a block diagram according to one embodiment of the invention showing the basic structure and an example of the transport routing based on having multiple 3 sector BTSs with 3 Digital Access Units (DAUs) at a Local Location, 3 DAUs at a Remote Location and RF interfaces at the Remotes. In this embodiment, three sector BTSs are connected to a daisy chained group of DAUs at both the local and remote locations.

To accommodate variations in wireless subscriber loading at wireless network antenna locations at various times of day and for different days of the week, there are several candidate conventional approaches.

One approach is to deploy many low-power high-capacity base stations throughout the facility. The quantity of base stations is determined based on the coverage of each base station and the total space to be covered. Each of these base stations is provisioned with enough radio resources, i.e., capacity and broadband data throughput to accommodate the maximum subscriber loading which occurs during the course of the workday and work week. Although this approach typically yields a high quality of service for wireless subscribers, the notable disadvantage of this approach is that many of the base stations' capacity is being wasted for a large part of the time. Since a typical indoor wireless network deployment involves capital and operational costs which are assessed on a per-subscriber basis for each base station, the typically high total life cycle cost for a given enterprise facility is far from optimal.

A second candidate approach involves deployment of a DAS along with a centralized group of base stations dedicated to the DAS. A conventional DAS deployment falls into one of two categories. The first type of DAS is "fixed", where the system configuration doesn't change based on time of day or other information about usage. The remote units associated with the DAS are set up during the design process so that a particular block of base station radio resources is thought to be enough to serve each small group of DAS remote units. A notable disadvantage of this approach is that most enterprises seem to undergo frequent re-arrangements and re-organizations of various staff groups within the enterprise. Therefore, it's highly likely that the initial DAS setup will need to be changed from time to time, requiring deployment of additional direct staff and contract resources with appropriate levels of expertise regarding wireless networks.

The second type of DAS is equipped with a type of network switch which allows the location and quantity of DAS remote units associated with any particular centralized base station to be changed manually. Although this approach would appear to support dynamic DAS reconfiguration based on the needs of the enterprise or based on time of day, it frequently implies that additional staff resources would need to be assigned to provide real-time management of the network. Another issue is that it's not always correct or best to make the same DAS remote unit configuration changes back and forth on each day of the week at the same times of day. Frequently it is difficult or impractical for an enterprise IT manager to monitor the subscriber loading on each base station. And it is almost certain that the enterprise IT manager has no practical way to determine the loading at a given time of day for each DAS remote unit; they can only guess the percentage loading.

Another major limitation of conventional DAS deployments is related to their installation, commissioning and optimization process. Some challenging issues which must be overcome include selecting remote unit antenna locations to ensure proper coverage while minimizing downlink interference from outdoor macro cell sites, minimizing uplink interference to outdoor macro cell sites, and ensuring proper intra-system handovers while indoors and while moving from outdoors to indoors (and vice-versa). The process of performing such deployment optimization is frequently characterized as trial-and-error. Therefore, the results may not be consistent with a high quality of service.

According to embodiments of the present invention, a highly efficient, easily deployed and dynamically reconfigurable wireless network is provided. The advanced system architecture provided by embodiments of the present invention provides a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Accordingly, embodiments of the DAS network provide a capability for Flexible Simulcast. With Flexible Simulcast, the amount of radio resources (such as RF carriers, LTE Resource Blocks, CDMA codes or TDMA time slots) assigned to a particular DRU or group of DRUs can be set via software control to meet desired capacity and throughput objectives or wireless subscriber needs. Applications of the present invention are suitable to be employed with distributed base stations, distributed antenna systems, distributed repeaters, mobile equipment and wireless terminals, portable wireless devices, and other wireless communication systems such as microwave and satellite communications.

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors. In other embodiments, additional sectors are associated with each BTS, for example, up to or more than 12 sectors.

An embodiment shown in FIG. 1 illustrates a DAS network architecture according to an embodiment of the present invention and provides an example of a data transport scenario between multiple 3 sector Base Stations and multiple remotely located DAUs. BTSs 1 through N are connected to DAU1, DAU2, and DAU3 (i.e., local DAUs) by an RF cable in the illustrated embodiment. Each of the local DAUs are connected to server 130. A Coarse Wavelength Division Multiplexer/Demux (CWDM) is utilized to facilitate data transport over a single fiber 112 from the local location to the remote location. Another embodiment of the data transport system could use a Dense Wavelength Division Multiplexer (DWDM). In this embodiment, the DAUs at the Local and Remote locations are daisy chained together using optical cable 140 and 141 to achieve routing of the RF signals. Utilizing these or other suitable wavelength division multiplexing techniques, each of the DAUs is able to operate in a different wavelength band. Additional description related to DAS is provided in U.S. patent application Ser. No. 13/754,702, filed on Jan. 30, 2013, entitled "Data Transport in a Virtualized Distributed Antenna System," the disclosure of which is hereby incorporated by reference in its entirety for all purposes.

FIG. 1 depicts a DAS system employing multiple Digital Access Units (DAUs) at the Local location and multiple Digital Access Units (DAUs) at the Remote location. In accordance with the present invention, each DAU provides unique information associated with each DAU, which uniquely identifies data received and transmitted by a particular Digital Access Unit. As illustrated in FIG. 1, the 3 sector base stations are connected to a daisy chained DAS network, although other configurations are included within the scope of the present invention.

One feature of embodiments of the present invention is the ability to route Base Station radio resources among the DAUs or group(s) of DAUs. In order to route radio resources available from one or more Base Stations, it is desirable to configure the individual router tables of the DAUs in the DAS network. This functionality is provided by embodiments of the present invention.

The DAUs are networked together to facilitate the routing of signals among multiple DAUs. The DAUs support the transport of the RF downlink and RF uplink signals between the Base Station and the various DAUs. This architecture enables the various Base Station signals to be transported simultaneously to and from multiple DAUs. PEER ports are used for interconnecting DAUs.

The DAUs have the capability to control the gain (in small increments over a wide range) of the downlink and uplink signals that are transported between the DAU and the base station (or base stations) connected to that DAU. This capability provides flexibility to simultaneously control the uplink and downlink connectivity of the path between a particular Remote DAU (or a group of DAUs) and a particular base station sector.

A single optical fiber can be used for the transportation of data between the Local DAUs and the Remote DAUs by using a Coarse Wavelength Division Multiplexer (CWDM) and De-multiplexer, connected, for example, through optical cable 112. Embodiments of the present invention are not limited to the use of an optical cable 112 and other communications media can be employed including Ethernet cable, Microwave Line of Sight Link, Wireless Link, Satellite Link, or the like.

Referring to FIG. 1, optical fiber 112 connects the local CWDM Mux/Demux to the Remote CWDM Mux/Demux. In the illustrated embodiment, three outputs are provided by the Remote CWDM Mux/Demux, for example, three different optical wavelengths. The optical cables 113 connect the Remote CWDM Mux/Demux to the remote DAUs (DAU 4, DAU 5, and DAU 6). Thus, embodiments of the present invention provide for Local DAUs (that can be connected to each other in the illustrated daisy chain or other configuration) that are connected to Remote DAUs, which can also be connecting to each other in a daisy chain or other configuration. As shown in FIG. 1, cables 140/141 and 142/143, which connect the Local and Remote DAUs, respectively, can be Ethernet cable, Optical cable, Microwave Line of Sight Link, Wireless Link, Satellite Link, or the like. Additionally, although the connections between the BTSs and the local DAUs are illustrated as RF cables, this is not required by embodiments of the present invention and other communications media can be utilized. Moreover, although the remote DAUs include an optical cable connection to the remote CWDM Mux/Demux and an RF cable in the Remote Plane, the connections in the Remote plane (e.g., to mobile access equipment) can be made using other communications media.

As illustrated in FIG. 1 at the Remote location, RF outputs are provided by the DAUs in the remote plane. In the illustrated embodiment, the DAUs are interconnected at the remote location (e.g., the DAUs are daisy chained at the remote location).

Embodiments of the present invention provide methods and systems that enable capacity shifting. As an example, a signal can be routed from BTS1, sector 1 (121), through an RF cable to DAU1 (102), transported over the optical fiber 111 through the Local CWDM Mux/Demux, over optical cable 112 to the Remote CWDM Mux/Demux, through optical cable 113 to DAU4 (105), and then routed down to DAU5 (106) via cable 142 and then output through the RF cable connected to DAU5. Thus, using embodiments of the present invention, it is possible to control the transmission of the signal at the remote location from any of the BTS sectors (e.g., BTS1, sector 1). As illustrated, embodiments of the present invention provide the flexibility to route signals from a predetermined RF input cable connected to the Local DAUs to a predetermined RF output cable connected to the Remote DAUs. Additionally, in the reverse direction, signals can be routed from a predetermined RF input cable connected to the Remote DAUs to a predetermined RF output cable connected to the Local DAUs. As an example, a signal could be received on the RF cable connected to DAU5 (106), routed to DAU4 (105), and then through the network. Thus, embodiments of the present invention provide the flexibility at the remote location to move capacity from one device to another, for example, if the remote DAUs are not physically in the same location, (e.g., DAU4 (105) is in one building, DAU5 (106) is located in another building, and DAU6 (107) is located in yet another building). In that case, flexibility is provided to be able to route signals in both directions onto different optical cables.

Referring to FIG. 1, embodiments of the present invention provide for a virtual extension or replication of the RF cables in the Hotel Plane to the RF cables in the Remote Plane. Thus, the BTSs have been virtually transported from the base station hotel to the remote location since the output of the RF cables in the Remote Plane can be identical to the inputs to the RF cables in the Hotel Plane, enabling interface with mobile access equipment. Although the connections in the Hotel Plane are illustrated as RF cables, this is not required by embodiments of the present invention and other communications media are included within the scope of the present invention, including Ethernet cable, Optical Fiber, Microwave Line of Sight Link, Wireless Link, or Satellite Link. In some embodiments, summing is utilized to provide a system in which a single DAU port is connected to a plurality of BTSs. For example, BTS 1, sector 1 (120), and BTS N, sector 1 (121) could be summed and then connected to a single port in DAU 1 (102).

According to embodiments of the present invention, DAUs are utilized at both the Local and Remote locations. The DAU communicates with a Network Operational Control (NOC). The NOC sends commands and receives information from the DAS network. The DAS network can include a plurality of DAUs and DRUs. The DAU communicates with the network of DRUs and the DAU sends commands and receives information from the DRUs. The DAUs include physical nodes that accept and deliver RF signals and optical nodes that transport data. A DAU can include an internal server or an external server. The server is used to archive information in a database, store the DAS network configuration information, and perform various traffic related processing. The server can be used to communicate information from the DAS Network to the NOC.

Additionally, the DRU communicates with the DAU. In some embodiments, the DRU does not communicate with the NOC. The DRU receives commands from the DAU and delivers information to the DAU. The DRUs include physical nodes that accept and deliver RF signals and optical nodes that transport data. As illustrated in FIG. 1, the use and connection of the DAUs to each other in the Remote location provide benefits not available in systems in which DRUs are utilized in the Remote location, for example, the use of server 131 in connection with the remote DAUs, since in some implementations, a server is not used with remote DRUs. In other implementations, the remote DRUs can be coupling to each other and can be connected to a server as discussed in relation to FIG. 3. As shown in FIG. 1, the remote DAUs are connected through cables 142 and 143.

FIG. 1 illustrates a scenario in which signals from Sector 1 121 of BTS 1 and signals from Sector 1 120 of BTS N are combined in DAU 1 102 and replicated at the output of DAU 4 105. These combined signals may be supported and broadcast to an antenna by the single RF Cable illustrated at the output of DAU 4 105. Alternatively, the six RF cables illustrated in the hotel plane as being received at DAU 1, DAU 2, and DAU 3 can also be provided in the remote plane as outputs of the set of remote DAUs. Thus, embodiments in which the number of RF cables in the hotel plane and the remote plane are equal or differ are included within the scope of the present invention.

Figure 2:
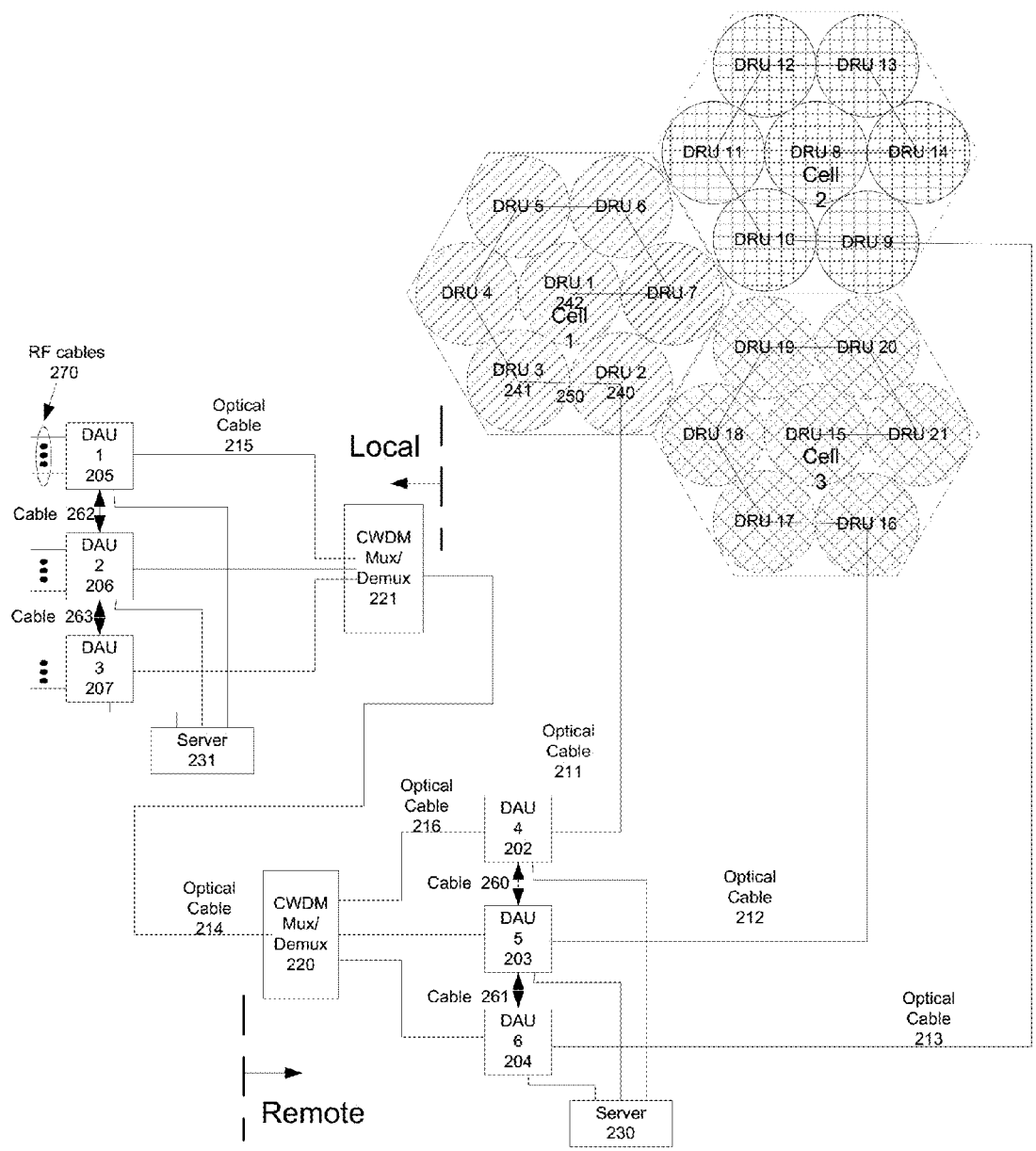
FIG. 2 is a block diagram according to one embodiment of the invention showing the basic structure and an example of the transport routing based on having multiple 3 sector BTSs with 3 DAUs at a Local Location, 3 DAUs at a Remote Location and Optical interfaces at the Remotes.

As shown in FIG. 2, the individual base station sector's radio resources are transported to a daisy-chained network of DRUs. Each individual sector's radio resources provide coverage to an independent geographical area via the networked DRUs. FIG. 2 demonstrates how three cells, each cell comprising an independent network of 7 DRUs, provide coverage to a given geographical area. A server is utilized to control the switching function provided in the DAS network. Referring to FIG. 2 and by way of example, DAU 1 (205) receives downlink signals and transmits uplink signals from and to BTS Sector 1 (120). DAU 1 translates the RF signals to optical signals for the downlink and translates the optical signals to RF signals for the uplink. The optical fiber cable (215) transports the desired signals to and from CWDM (221) whereby the distinct DAU optical wavelengths are multiplexed and de-multiplexed. Optical cable (214) transports all the optical signals between CWDM (221) and CWDM (220). DAU 4 (202) transports the optical signal to and from CWDM (220). DAU 4 (202) transports the uplink and downlink data to and from a daisy chain of DRUs. The other DRUs in the daisy chain are involved in passing the optical signals onward to DRU 1 (247). Although not illustrated in FIG. 2, it will be appreciated that RF cables 270 connect to the BTSs.

The signals from DAU 4 202, DAU 5 203, and DAU 6 204 are transported to the daisy chained DRUs using optical cables 211, 212, and 213, respectively. Thus, as an alternative system to that illustrated in FIG. 1, rather than replicating the RF signals provided to DAU 1, DAU 2, and DAU 3 (see RF Cables 270), the output of the remote DAUs is transported using the optical cables to the DRUs for broadcast.

Figure 3:
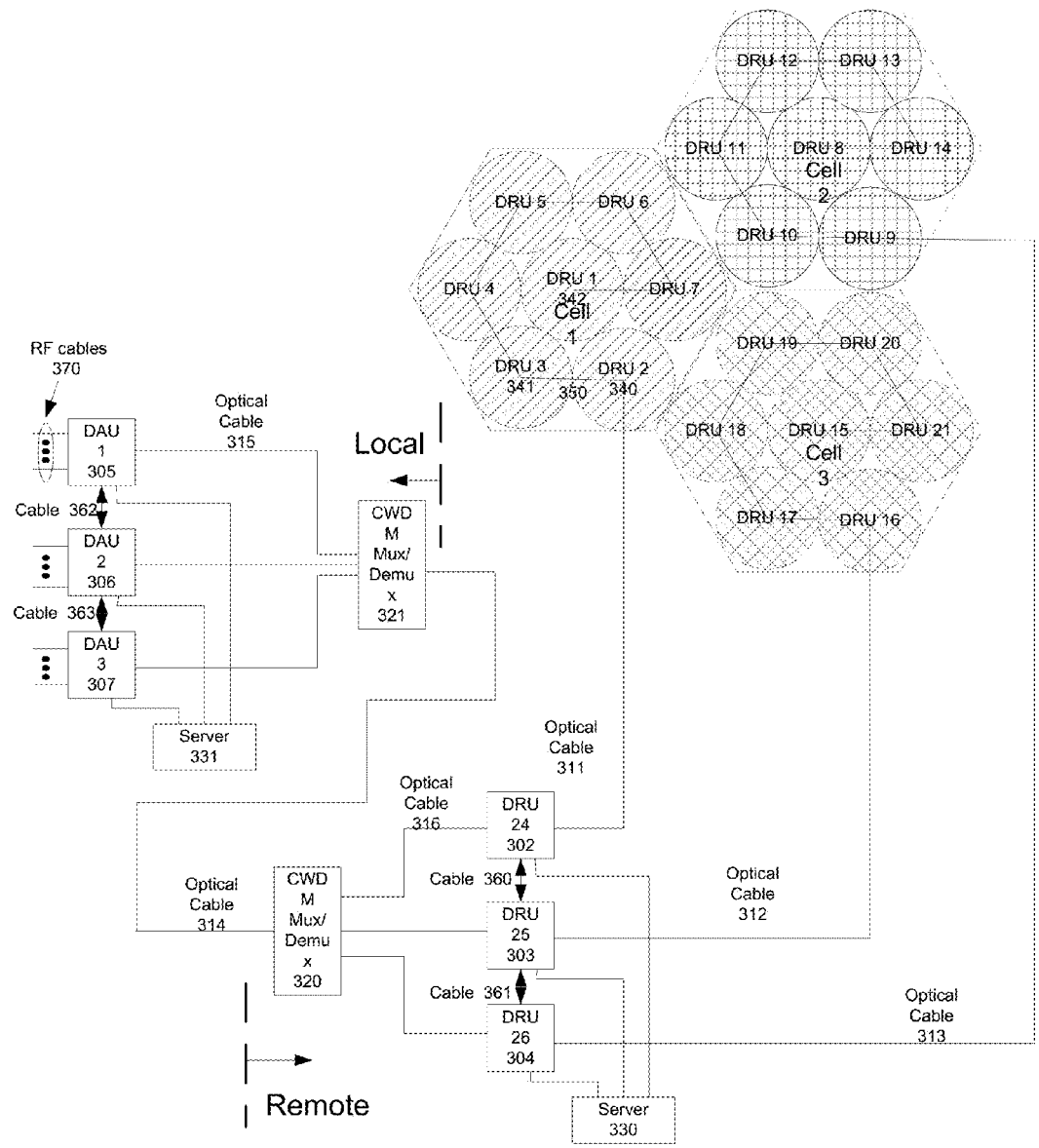
FIG. 3 is a block diagram according to one embodiment of the invention showing the basic structure and an example of the transport routing based on having multiple 3 sector BTSs with 3 DAUs at a Local Location, 3 Digital Remote Units (DRUs) at a Remote Location and Optical interfaces at the Remotes.

FIG. 3 depicts a DAS system employing multiple Digital Access Units (DAUs) at the Local location and multiple Digital Remote Units (DRUs) at the Remote location. In accordance with the present invention, each DRU provides unique information associated with each DRU, which uniquely identifies data received and transmitted by a particular Digital Remote Unit.

DRU 24 (302) is located at the Remote location, and is connected via daisy-chain to 7 additional DRU units that occupy Cell 1 (350). Similarly, DRU 25 (303) connects to a daisy chain of DRUs occupying Cell 3 and DRU 26 (304) connects to a daisy-chain of DRUs occupying Cell 2. The remote DRUs 24, 25 and 26 are interconnected which facilitates the routing of signals between DRUs.

The servers illustrated herein, for example, server 330 provide unique functionality in the systems described herein. The following discussion related to server 330 may also be applicable to other servers discussed herein an illustrated in the figures. Server 330 can be used to set up the switching matrices to allow the routing of signals between the remote DRUs. The server 330 can also store configuration information, for example, if the system gets powered down or one DRU goes off-line and then you power up the system, it will typically need to be reconfigured. The server 330 can store the information used in reconfiguring the system and/or the DRUs.

Figure 4:
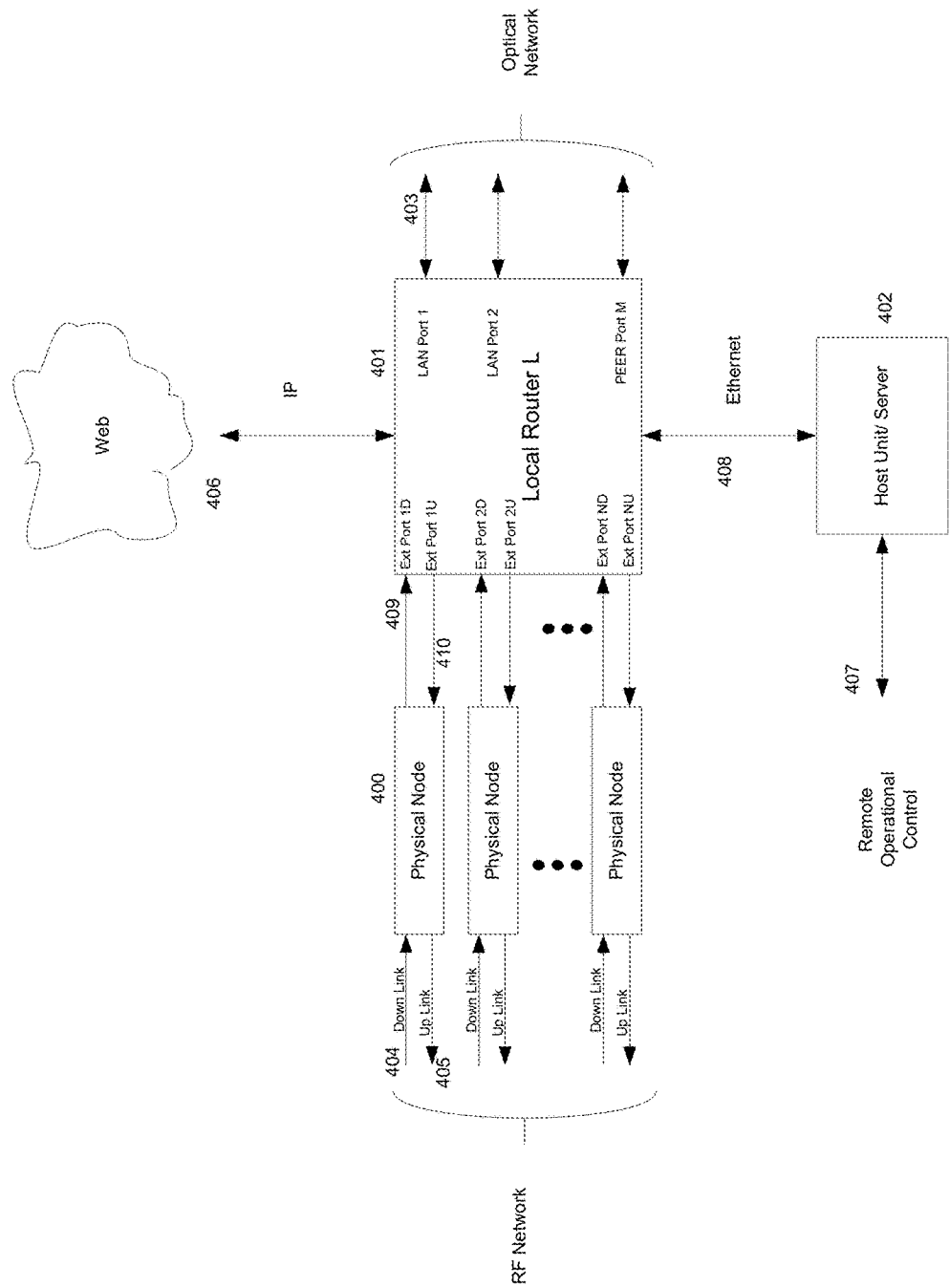
FIG. 4 is a block diagram illustrating a DAU, which contains physical Nodes and a Local Router, according to an embodiment of the present invention.

FIG. 4 shows the two elements in a DAU, the Physical Nodes (400) and the Local Router (401). The Physical Nodes translate the RF signals to baseband for the Downlink and from baseband to RF for the Uplink. The Local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
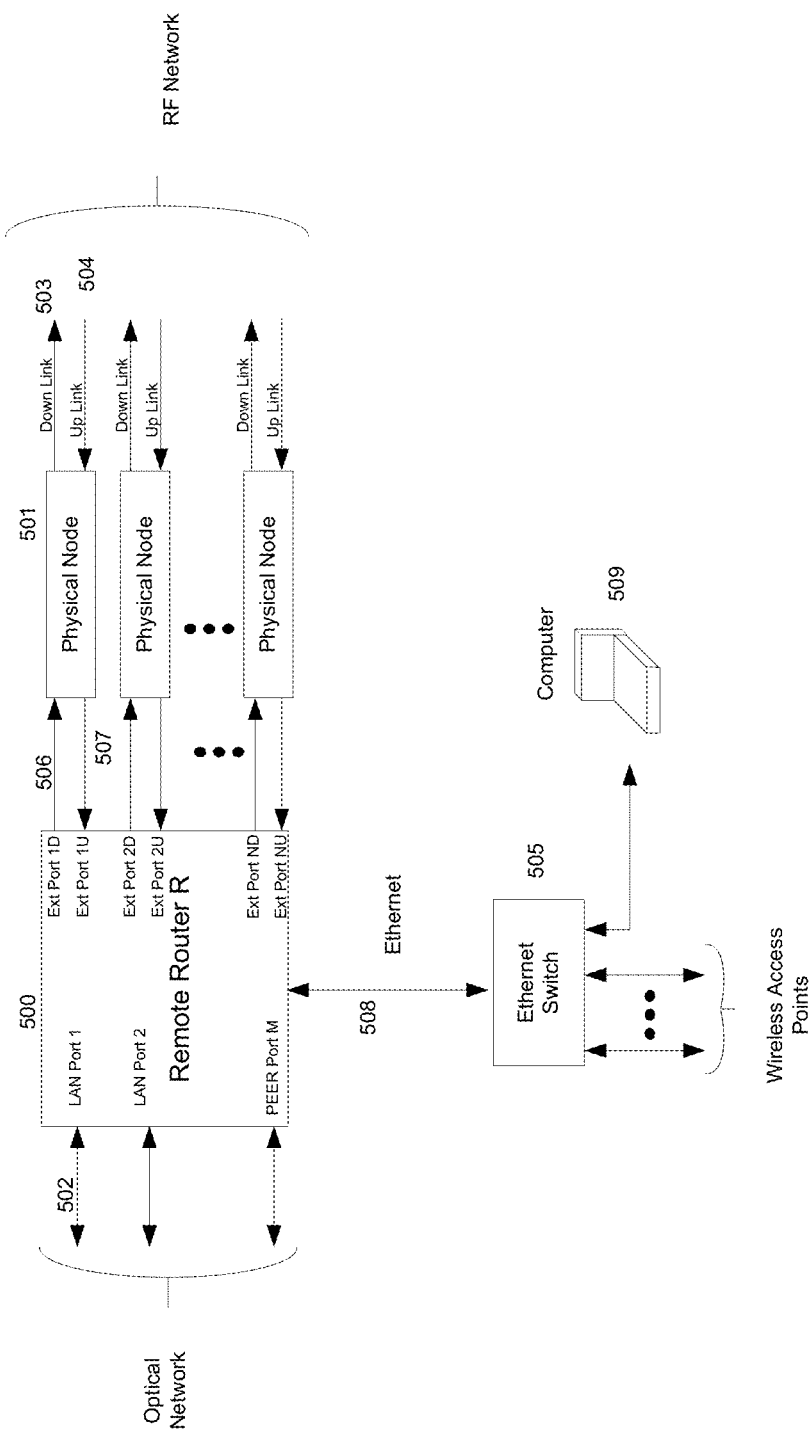
FIG. 5 is a block diagram illustrating a DRU according to an embodiment of the present invention.

FIG. 5 shows the two elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains a Ethernet Switch (505) so that a remote computer or wireless access points can connect to the internet.

In some embodiments, the DAU is connected to a host unit/server, whereas the DRU does not connect to a host unit/server. In these embodiments, parameter changes for the DRU are received from a DAU, with the central unit that updates and reconfigures the DRU being part of the DAU, which can be connected to the host unit/server. Embodiments of the present invention are not limited to these embodiments, which are described only for explanatory purposes.

Figure 6:
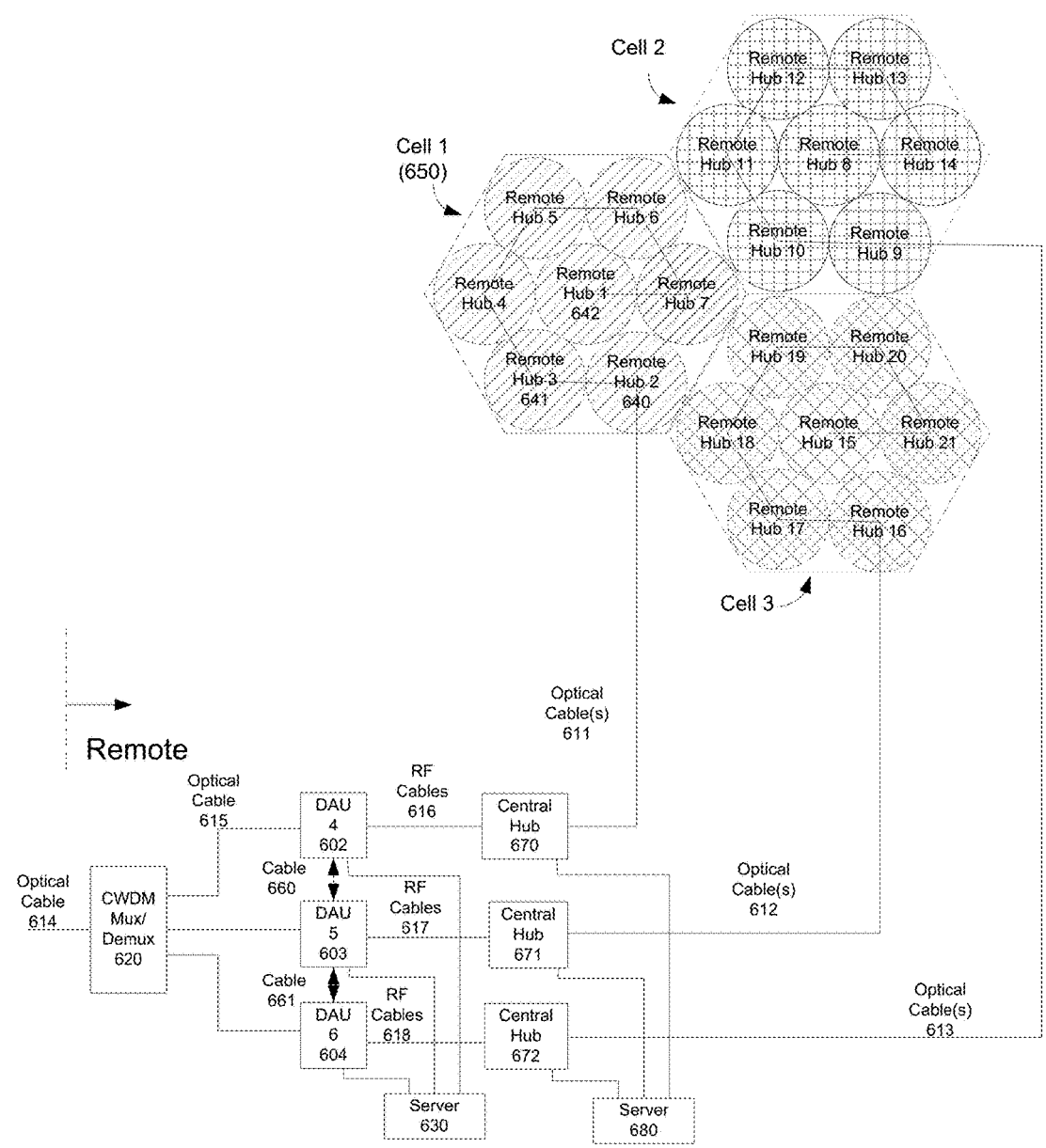
FIG. 6 is a block diagram according to one embodiment of the invention showing the basic structure and an example of the transport routing based on having multiple 3 sector BTSs with 3 DAUs at a Local Location, 3 DAUs at a Remote Location interfacing to multiple Central Hubs.
Figure 7:
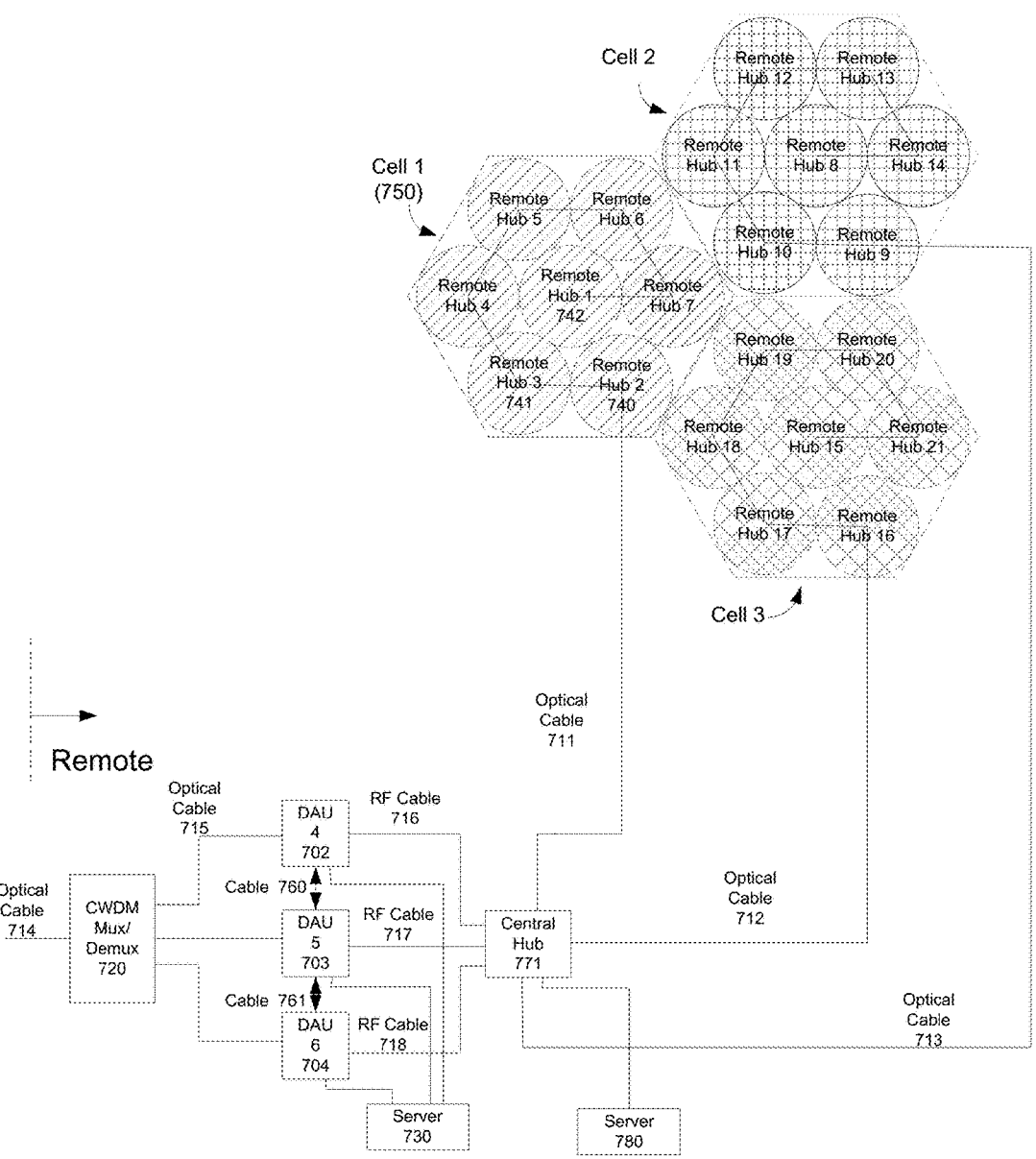
FIG. 7 is a block diagram according to one embodiment of the invention showing the basic structure and an example of the transport routing based on having multiple 3 sector BTSs with 3 DAUs at a Local Location, 3 DAUs at a Remote Location interfacing to one Central Hub.

FIG. 6 depicts the connection between a plurality of DAUs at the Remote location (i.e., DAU 4 602, DAU 5 603, and DAU 6 604) with a plurality of Central Hubs (670, 671, and 672). The Central Hubs operate in the analog domain and are suitable for receiving analog signals using the illustrated RF cables 616, 617, and 618. Accordingly, the transportation between the Remote DAUs and the Central Hubs is via a RF cable in the illustrated embodiment (i.e., RF cables 616, 617, and 618). In this implementation, the RF signals are carried over fiber from the Central Hubs to the Remote Hubs, which are daisy chained as illustrated in FIG. 6. Accordingly, the interconnection between the Central Hubs and the Remote Hubs is via an optical cable (i.e., optical cables 611, 612, and 613) in the illustrated embodiment. FIG. 7 depicts the connection between a plurality of DAUs at the Remote location with one Central Hub. The Central Hub then transports the signal to a plurality of Remote Hubs. The remote DAUs (602, 603, and 604) receive digital signals over the optical cables 615 connected to the CWDM Mux/Demux 620, perform conversion from digital to analog, and provide analog signals using RF cables 616, 617, and 618 to the set of Central Hubs.

In order to efficiently utilize the limited base station resources, the network of DRUs provides the capability of re-directing their individual uplink and downlink signals to and from any of the BTS sectors. Because the DRUs data traffic has unique streams, the DAU Router has the mechanism to route the signal to different sectors.

Referring to FIG. 6, the output RF cables 616, 617, and 618 are provided as RF outputs in the illustrated embodiment by DAU 4 (602), DAU 5 (603), and DAU 6 (604) respectively. Accordingly, access and/or interface functionality is provided by embodiments of the present invention to a variety of mobile access equipment providers. RF output cables 616, 617, and 618 connect to central hubs 670, 671, and 672. Additional description related to central hubs is provided in relation to FIG. 8. Thus, embodiments of the present invention provide a virtual base station at the remote interfaces to the central hubs, since the RF output cables 616, 617, and 618 can replicate the RF cables in the Hotel Plane of FIG. 1. Thus, a base station is virtually transported to connect to the central hubs illustrated in FIG. 6.

Figure 8:
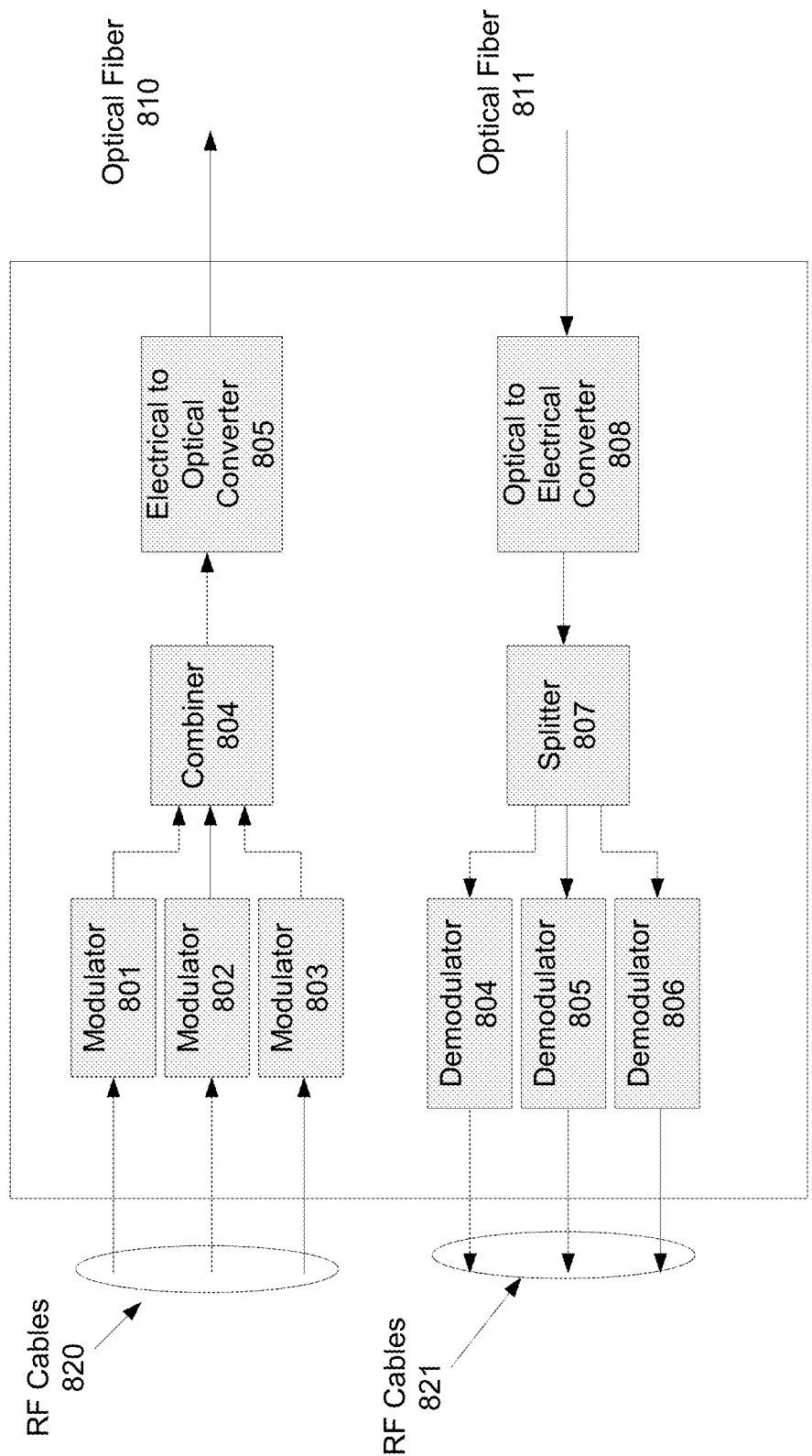
FIG. 8 is a block diagram of a Central Hub according to an embodiment of the present invention.

FIG. 8 is a block diagram of a Central Hub according to an embodiment of the present invention. Referring to FIG. 8, the Central Hub receives RF signals on RF cables 820 and includes a set of electrical to optical converters 805/808. In operation, the central hub receives RF signals on RF cables 820 and effectively sums the received RF signals at combiner 804 to provide an RF input to the electrical to optical converter 805. As a result, the central hub receives RF signals through RF cables 820 and provides an optical output on optical fiber 810, e.g., by modulating a laser using the electrical signal received at the electrical to optical converter 805, the laser being a component of the electrical to optical converter 805.

In the return path, the optical signal is received using optical fiber 811 and is converted to an electrical signal using optical to electrical converter 808, which can utilize a photodiode. The converted RF signal on the return path is transported through RF cables 821.

Referring to FIG. 8, the modulators provide increased systems flexibility, since an IF signal could be received as an input on the transmit path and then modulated up to an RF carrier. Demodulation can be performed in the return path as appropriate to the received and desired signal frequencies.

Referring once again to FIG. 6, signals on RF cables 616, 617, and 618 are received at the Central Hubs 670, 671, and 672, respectively. The outputs of the Central Hubs are optical signals, which can be transported on optical cables 611, 612, and 613 to the various remote hubs 1-21 arranged in Cells 1-3.

Figure 9:
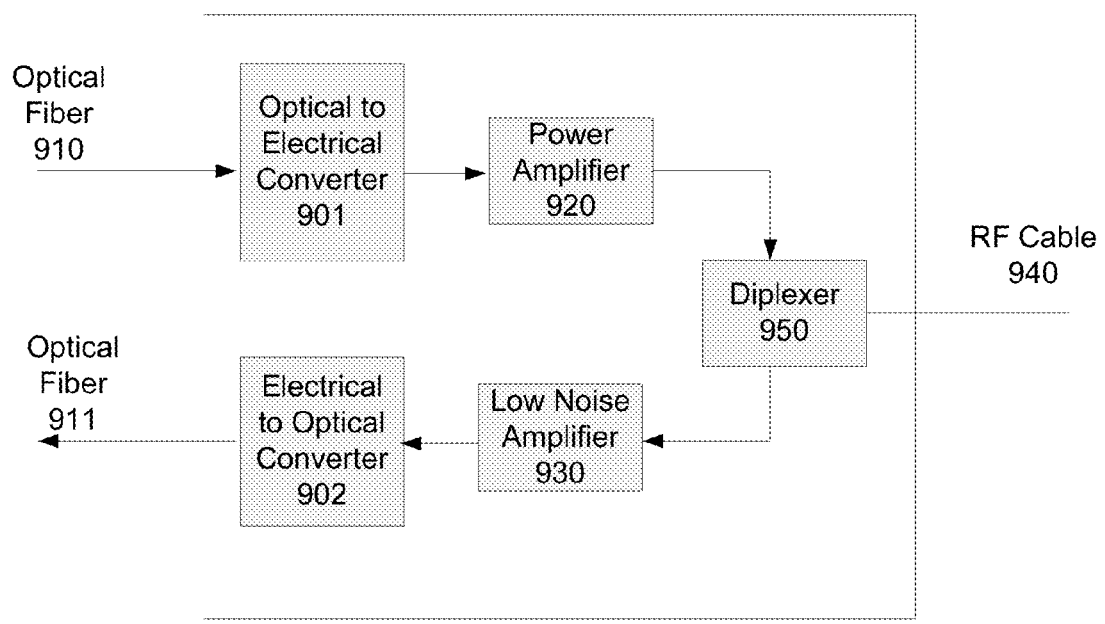
FIG. 9 is a block diagram of a Remote Hub according to an embodiment of the present invention.

FIG. 9 provides additional description related to remote hubs. At the remote hub, the optical signal is received on optical fiber 910 and is converted using optical to electrical converter 901 (e.g., including a photodiode) to provide an RF electrical signal. An RF power amplifier 920 is used to amplify the electrical signal that is then provided to a diplexer, which filters the signal before transport on RF cable 940 to an antenna. In some embodiments, the received signal can be amplified in the optical domain using an optical amplifier and then converted to an electrical signal. One of ordinary skill in the art would recognize many variations, modifications, and alternatives.

In the return/receive path, the signal received from the antenna comes in through RF cable 940, is delivered to the diplexer, which routes the signal to low noise amplifier 930, where the signal is amplified at RF frequencies, and electrical to optical converter 802, which can include a diode laser, thereby providing an optical output that is transported on optical fiber 911. The optical fiber connects to one of the central hubs illustrated in FIG. 6. In some embodiments, the electrical to optical conversion in the return path can be performed prior to optical amplification.

Referring once again to FIG. 6, a single optical cable 611 is illustrated as connecting central hub 670 and the remote hubs in Cell 1 (650). In other implementations, the central hubs can utilize multiple optical cables, with multiple optical cables replacing the single optical cable 611 illustrated in FIG. 6. At the remote plane (i.e., the output of DAUs 602, 603, and 604), the RF signals from the hotel plane have been replicated, which can be provided to the Central Hub for delivery using the illustrated RF over fiber system including the Remote Hubs. Accordingly, extension of the RF over fiber system into the remote plane is enabled by embodiments of the present invention.

FIG. 7 illustrates an alternative embodiment in which the RF cables from the various DAUs 702, 703, and 704 are provided as inputs in the transmit path to a single central hub 771, which also includes multiple outputs in the transmit path to the remote hubs. As illustrated, Central Hub 771 receives inputs from RF cables 702, 703, and 704. The signals from these inputs are transmitted to the daisy chained Remote Hubs in Cells 1, 2, and 3 using optical cable 711, 712, and 713. Although single RF cables 716, 717, and 718 are illustrated for purposes of clarity, it will be appreciated that multiple cables, as well as multiple sets of RF cables can be used to support downlink and uplink functionality as discussed above.

The architecture illustrated in FIG. 7 provides the capability to perform dynamic sectorization. Referring to FIG. 1, Sector 1 (121) of BTS 1 and Sector 1 (120) of BTS N were combined in DAU 1 and transported on optical cable 111. Sector 2 of BTS 1 and Sector 2 of BTS N were combined in DAU 2 and Sector 3 of BTS 1 and Sector 3 of BTS N were combined in DAU 3. Accordingly, each DAU in the hotel plane supports a different sector. In the remote plane, these different sectors are supported by each of DAUs 4, 5, and 6.

As illustrated in FIG. 7, RF cables 716, 717, and 718 from DAU 4, DAU 5, and DAU 6 support each of the different sectors (RF cable 716 associated with Sector 1, RF cable 717 associated with Sector 2, and RF cable 718 associated with Sector 3, respectively), which are provided to the Central Hub 771. In the Central Hub 771, processing can be performed to control which Sectors are transported on optical cables 711, 712, 713, respectively. As an example, all the Sector 1 signals could be supported on optical cables 711 and 712. Alternatively, all the Sector 1 signals could be supported on optical cables 711, 712, and 713. Accordingly, this architecture enables dynamic sectorization.

FIG. 8 shows the primary elements in a Central Hub for the Downlink and Uplink channels. The downlink channel is comprised of: Modulators (801), a RF Combiner (804), and an Electrical to Optical Converter (805). The modulators translate the input signals onto the appropriate RF carrier frequencies. The combiner 804 performs the summation of the Modulated signals. The combined signal is the input to the optical transmitter inside the Electrical to Optical Converter (805). As an example, the electrical to optical converter 805 includes a semiconductor laser used to generate the optical signal for transmission over optical fiber 810. The modulated analog signals after combination are fed to the electrical to optical converter to effectively modulate the optical signal, thus the use of the term RF over fiber since the analog RF signals output from the electrical to optical converter 805 are transported over optical fiber 810. The uplink channel is comprised of: Demodulators (804), a RF Splitter (807), and an Optical to Electrical Converter (808). The optical fiber signal (811) is input into the Optical to Electrical Converter (808), which typically includes a photodiode. The output from the photodiode is sent to one or more Demodulators (804) using a Splitter (807). The Demodulators (804) translate the RF input signals onto the appropriate carrier frequencies before they are transmitted over the RF cables (820). Optical fiber 810 is used to send out the RF over fiber signal for the downlink to the remote hubs. For the uplink which is coming from the remote hubs back towards the base station, the RF over fiber signals will be received using optical fiber 811. Referring once again to FIG. 6, optical cable(s) 611 can represent a set of cables providing downlink and uplink signals illustrated using optical fibers 810 and 811. Additionally, FIG. 6 illustrates multiple RF cables 616 as providing the inputs to Central Hub 670, analogous to the two sets of RF cables 820 and 821. Thus, it will be appreciated that the multiple RF cables 616 provide multiple inputs to the Central Hubs in both the downlink and uplink paths. In some embodiments, the DAU provides four RF outputs, suitable for providing the multiple RF signals carried by RF cables 820 and receiving multiple RF cables 821. Similar discussion applies to RF cables 617 and 618.

FIG. 9 shows the primary elements in a Remote Hub for the Downlink and Uplink channels. An example of a Remote Hub as illustrated in FIG. 9 is Remote Hub (640) illustrated FIG. 6 or Remote Hub 2 (740) illustrated in FIG. 7. The downlink channel is comprised of an Optical to Electrical Converter (901) and a Power Amplifier (920). The Optical to Electrical Converter (901) includes a photodiode. The output of the Optical to Electrical Converter is input into a Power Amplifier (920) that amplifies the RF signal. The uplink channel includes a Low Noise Amplifier (930) and an Electrical to Optical Converter (902). The Low Noise Amplifier (930) amplifies the received signal from the Diplexer (950) and outputs the RF signal to the Electrical to Optical Converter (902). The Electrical to Optical Converter (902) includes an optical Transmitter. The Diplexer (950) serves as a 3 port filter that separates the Downlink signals form the Uplink signals and interfaces with the RF cable that connects to the antenna.

Figure 10:
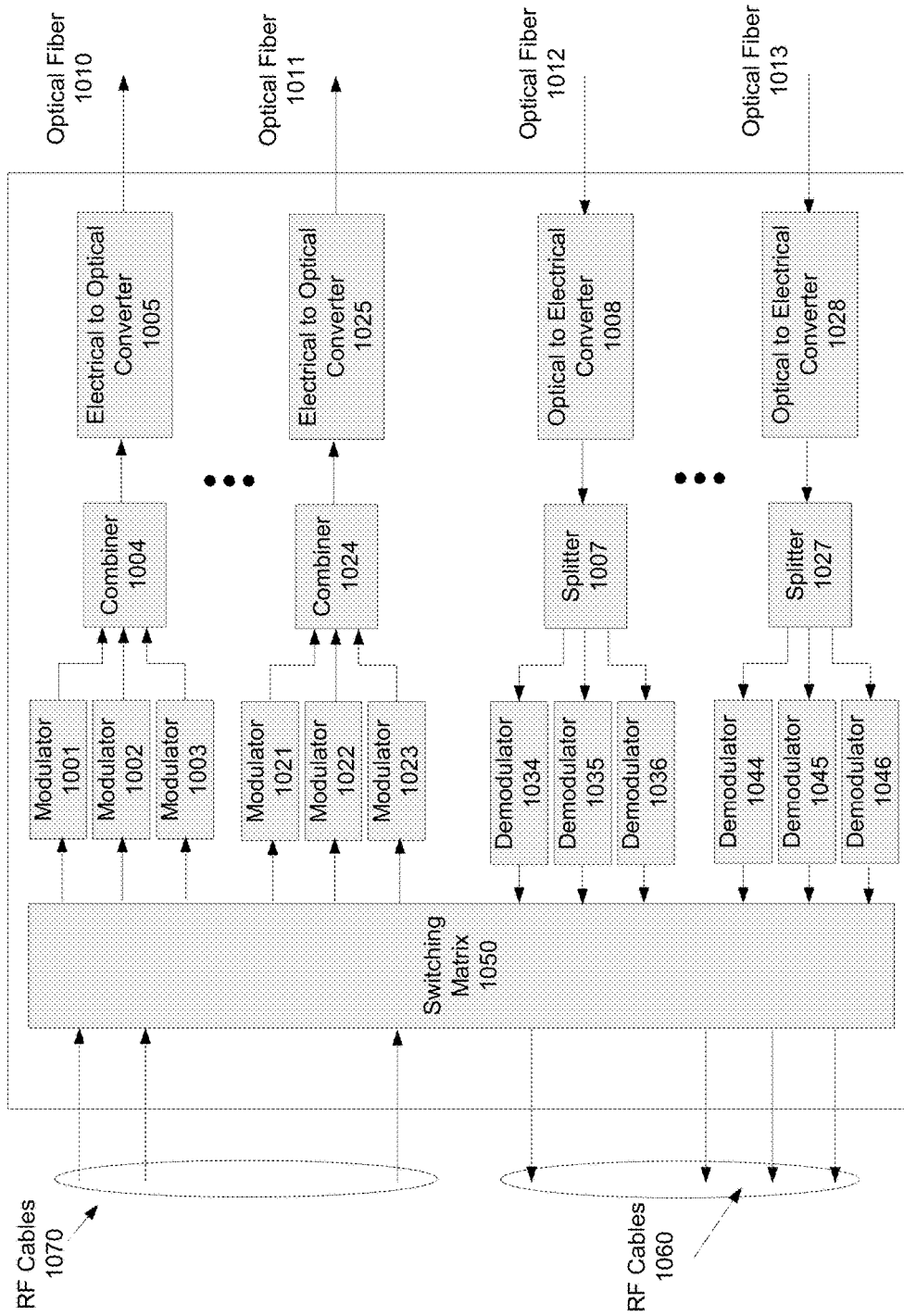
FIG. 10 is block diagram of a Central Hub suitable for dynamic sectorization according to an embodiment of the present invention.

FIG. 10 is block diagram of a Central Hub suitable for dynamic sectorization according to an embodiment of the present invention. The Central Hub illustrated in FIG. 10 shares some similarities with the Central Hub illustrated in FIG. 8 and the description provided in FIG. 8 is applicable to common components as appropriate. Switching matrix 1050 is provided to switch RF signals received on RF cables 1070 to different modulator/combiner/electrical to optical converter sets.

Referring to FIG. 10, the Central Hub includes a switching matrix 1050 that is used to route the RF signals received from RF cables 1070 and 1060 to the various modulators and from the various modulators 1001-1003, 1021-1023, 1034-1036, and 1044-1046. One feature of the Central Hub with the illustrated switching matrix is the ability to allocate RF signals from different BTS sectors to different optical outputs. This feature enables dynamic sectorization of BTS resources. Each optical output from the Central Hub (i.e., optical fibers 1010 and 1011) delivers the optically modulated RF signal to a daisy chain of Remote Hubs as illustrated in FIG. 7. Accordingly, the switching matrix has the capability to route the BTS sectors to the various Remote Hubs.

Figure 11:
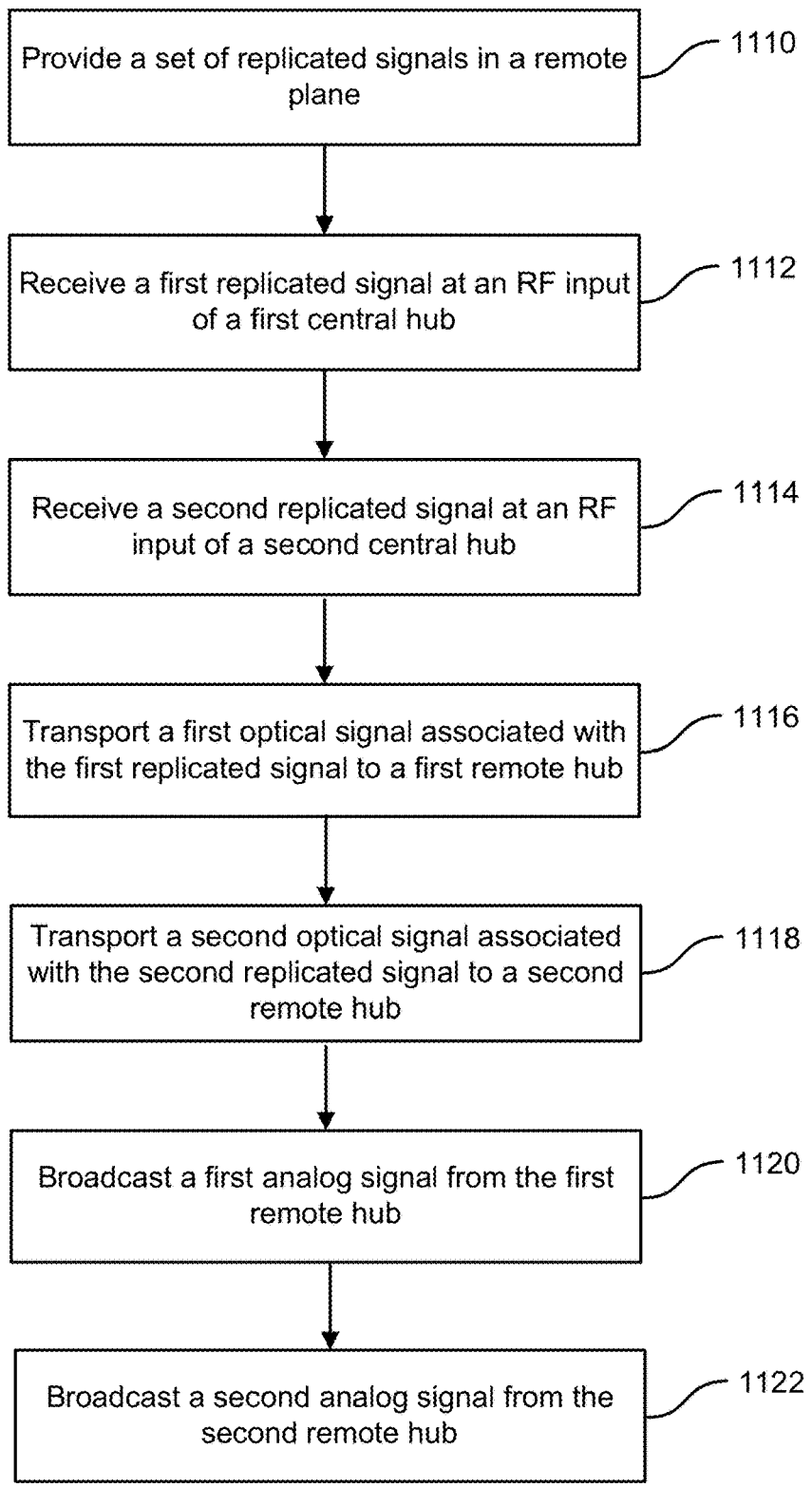
FIG. 11 is a simplified flowchart illustrating a method of transporting signals according to an embodiment of the present invention.

FIG. 11 is a simplified flowchart illustrating a method of transporting signals according to an embodiment of the present invention. The method includes providing a set of replicated signals in a remote plane (1110), receiving a first replicated signal at an RF input of a first central hub (1112), and receiving a second replicated signal at an RF input of a second central hub (1114). The replicated signals can be analog signals and providing the set of replicated signals can include transporting these analog signals using an RF cable. Referring to FIG. 6, RF cables 616, 617, and 618, which each represent sets of RF cables, support replicated signals that were initially present in the Hotel plane (see FIG. 1). In an embodiment, each set of RF cables can support signals associated with a sector of a set of BTSs (e.g., Sector 1 of BTS 1 and BTS 2 supported by a first set of RF cables and Sector 2 of BTS 1 and BTS 2 supported by a second set of RF cables).

The method also includes transporting a first optical signal associated with the first replicated signal to a first remote hub (1116) and transporting a second optical signal associated with the second replicated signal to a second remote hub (1118). In the embodiment illustrated in FIG. 6, transporting the first optical signal comprises transmitting the first optical signal though a first optical fiber 611 and transporting the second optical signal comprises transmitting the second optical signal through a second optical fiber 612.

The method further includes broadcasting a first analog signal from the first remote hub (1120) and broadcasting a second analog signal from the second remote hub (1122). As illustrated in FIG. 6, the daisy chained remote hubs in each of the three cells is used to broadcast analog signals associated with the RF over fiber signals transmitted using optical cables 611, 612, and 613.

It should be appreciated that the specific steps illustrated in FIG. 11 provide a particular method of transporting signals according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
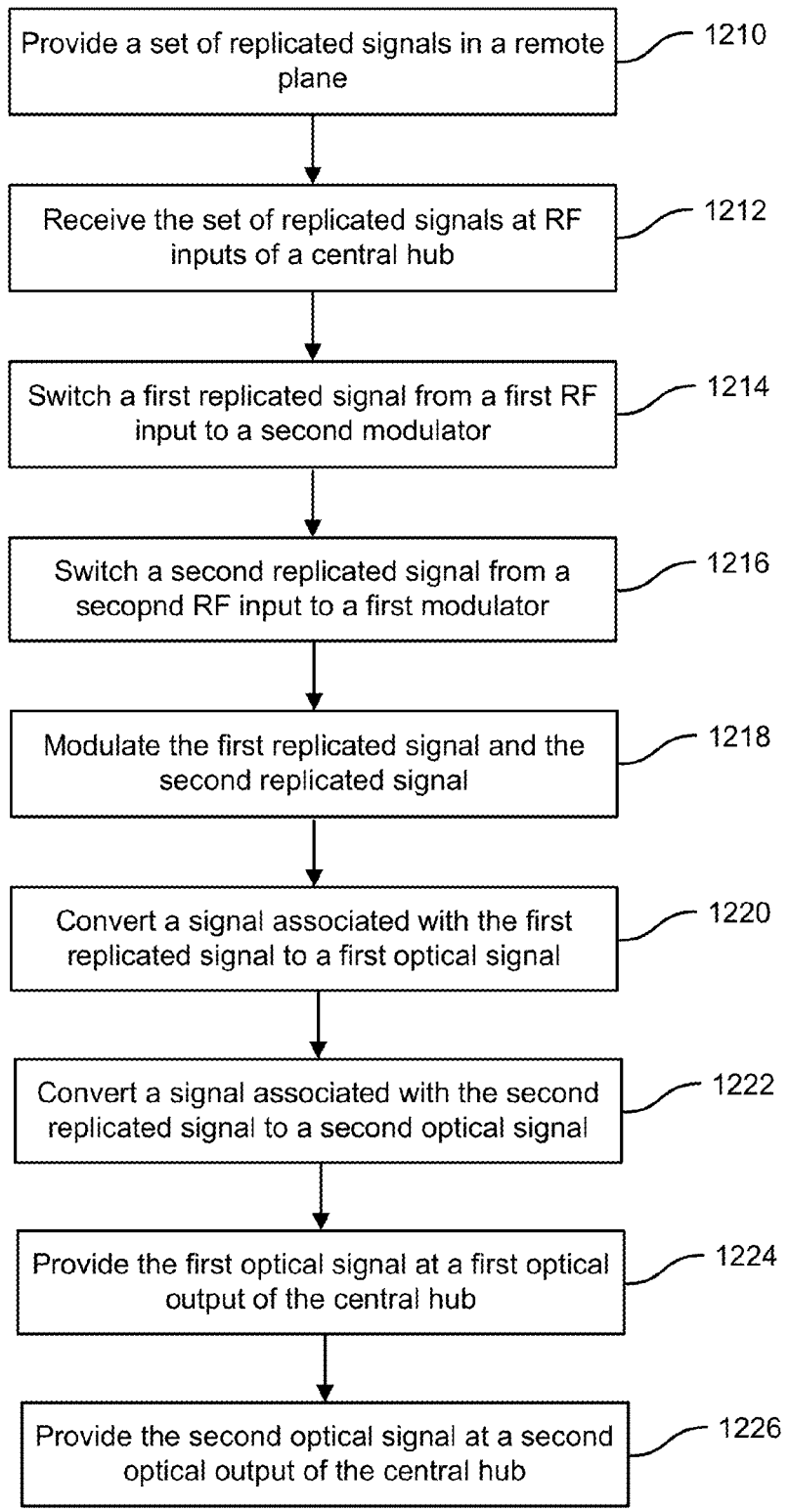
FIG. 12 is a simplified flowchart illustrating a method of performing dynamic sectorization according to an embodiment of the present invention.

FIG. 12 is a simplified flowchart illustrating a method of performing dynamic sectorization according to an embodiment of the present invention. The method includes providing a set of replicated signals in a remote plane (1210) and receiving the set of replicated signals at RF inputs of a central hub (1212). Referring to FIG. 7, RF cables 716, 717, and 718, which each represent sets of RF cables, support replicated signals that were initially present in the Hotel plane (see FIG. 1). In an embodiment, each set of RF cables can support signals associated with a sector of a set of BTSs (e.g., Sector 1 of BTS 1 and BTS 2 supported by a first set of RF cables and Sector 2 of BTS 1 and BTS 2 supported by a second set of RF cables).

The method also includes switching a first replicated signal from a first RF input to a second modulator (1214), switching a second replicated signal from a second RF input to a first modulator (1216) and modulating the first replicated signal and the second replicated signal (1218). In an embodiment, the first replicated signal comprises a first analog signal associated with a first set of sectors and the second replicated signal comprises a second analog signal associated with a second set of sectors. Switching is performed in the embodiment illustrated in FIG. 10 using a switching matrix of the central hub that is coupled to the RF inputs of the central hub. Thus, embodiments of the present invention provide the ability to switch signals in order to direct signals associated with various sectors to different cells of the system.

The method further includes converting a signal associated with the first replicated signal to a first optical signal (1220) and converting a signal associated with the second replicated signal to a second optical signal (1222). As illustrated in FIG. 10, after switching and modulation, several signals can be combined prior to electrical to optical conversion. Thus, the signal associated with the replicated signal may include several modulated and combined replicated signals. As illustrated in FIG. 10, the switching matrix can be further coupled to a plurality of sets of modulators.

Additionally, the method includes providing the first optical signal at a first optical output of the central hub (1224) and providing the second optical signal at a second optical output of the central hub (1226).

It should be appreciated that the specific steps illustrated in FIG. 12 provide a particular method of performing dynamic sectorization according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Table 1 is a glossary of terms used herein, including acronyms.

TABLE 1

| | Glossary of Terms |
|---|---|
| ACLR | Adjacent Channel Leakage Ratio |
| ACPR | Adjacent Channel Power Ratio |
| ADC | Analog to Digital Converter |
| AQDM | Analog Quadrature Demodulator |
| AQM | Analog Quadrature Modulator |
| AQDMC | Analog Quadrature Demodulator Corrector |
| AQMC | Analog Quadrature Modulator Corrector |
| BPF | Bandpass Filter |
| CDMA | Code Division Multiple Access |
| CFR | Crest Factor Reduction |
| DAC | Digital to Analog Converter |
| DET | Detector |
| DHMPA | Digital Hybrid Mode Power Amplifier |
| DDC | Digital Down Converter |
| DNC | Down Converter |
| DPA | Doherty Power Amplifier |
| DQDM | Digital Quadrature Demodulator |
| DQM | Digital Quadrature Modulator |
| DSP | Digital Signal Processing |
| DUC | Digital Up Converter |
| EER | Envelope Elimination and Restoration |
| EF | Envelope Following |
| ET | Envelope Tracking |
| EVM | Error Vector Magnitude |
| FFLPA | Feedforward Linear Power Amplifier |
| FIR | Finite Impulse Response |
| FPGA | Field-Programmable Gate Array |
| GSM | Global System for Mobile communications |
| I-Q | In-phase/Quadrature |
| IF | Intermediate Frequency |
| LINC | Linear Amplification using Nonlinear Components |
| LO | Local Oscillator |
| LPF | Low Pass Filter |
| MCPA | Multi-Carrier Power Amplifier |
| MDS | Multi-Directional Search |
| OFDM | Orthogonal Frequency Division Multiplexing |
| PA | Power Amplifier |
| PAPR | Peak-to-Average Power Ratio |
| PD | Digital Baseband Predistortion |
| PLL | Phase Locked Loop |
| QAM | Quadrature Amplitude Modulation |
| QPSK | Quadrature Phase Shift Keying |
| RF | Radio Frequency |
| RRH | Remote Radio Head |
| RRU | Remote Radio Head Unit |
| SAW | Surface Acoustic Wave Filter |
| UMTS | Universal Mobile Telecommunications System |
| UPC | Up Converter |
| WCDMA | Wideband Code Division Multiple Access |
| WLAN | Wireless Local Area Network |

What is claimed is:

1. A system for the transport of RF signals, the system comprising:

one or more Digital Access Units (DAUs) located at a first location, wherein each DAU at the first location comprises at least one radio frequency (RF) connection port and at least one optical connection port;

one or more DAUs located at a second location, wherein each DAU at the second location comprises at least one RF connection port and at least one optical connection port;

a first mux/demux located at the first location and coupled to the DAUs at the first location;

a second mux/demux located at the second location and coupled to the DAUs at the second location;

wherein the DAUs at the first location are configurable to receive a set of RF input signals from at least one base transceiver station (BTS) via one or more RF connection ports;

wherein the DAUs at the first location are further configurable to send a set of digitized signals that are representative of the set of RF input signals to the DAUs at the second location via one or more optical connection ports; and wherein the DAUs at the second location are configurable to receive optical signals from the second mux/demux and send a set of RF output signals based on the received optical signals from the second mux/demux that are representative of the set of RF input signals to a plurality of remote units via one or more RF connection ports.

2. The system of claim 1, wherein the system is configurable to allow capacity shifting.

3. The system of claim 1, wherein any RF input signal can be sent to any remote unit.

4. The system of claim 1, wherein the first location and second location are more than ten kilometers apart.

5. The system of claim 1, wherein the first mux/demux and the second mux/demux comprise at least one of CWDM or DWDM systems.

6. The system of claim 1, wherein the DAUs at the second location are configurable to send a set of RF output signals that are representative of the set of RF input signals to a plurality of remote units via a central hub.

7. The system of claim 6, wherein the central hub comprises:
a transmit path including an RF input and a plurality of optical outputs; and
a receive path including a plurality of optical inputs and an RF output.

8. The system of claim 6, further comprising a first server coupled to the central hub.

9. The system of claim 1, wherein DAUs at the first location are coupled to each other and operable to route signals between each other.

10. The system of claim 9, wherein DAUs at the second location are coupled to each other and operable to route signals between each other.

11. The system of claim 1, wherein the set of RF input signals is identical to the set of RF output signals.

12. A method of transporting signals, the method comprising:
at a first set of digital access units (DAUs) at a first location, receiving a set of RF input signals from at least one base transceiver station (BTS);
at the first set of DAUs, providing a set of digitized signals that are representative of the set of RF input signals;
sending the set of digitized signals from the first set of DAUs to a second set of DAUs at a second location, wherein the second set of DAUs are configured to receive digitized signals from a mux/demux;
sending a set of RF output signals based on the received digitized signals from the mux/demux that are representative of the set of RF input signals from the second set of DAUs to a plurality of remote units.

13. The method of claim 12 further comprising:
at the first set of DAUs, receiving a second set of RF input signals from at least one BTS;
at the first set of DAUs, providing a second set of digitized signals that are representative of the second set of RF input signals;
sending the second set of digitized signals from the first set of DAUs to a third set of DAUs at a third location;
sending a second set of RF output signals that are representative of the second set of RF input signals from the third set of DAUs to a plurality of remote units.

14. The method of claim 12, wherein the first location and second location are more than ten kilometers apart.

15. The method of claim 12, wherein sending a set of RF output signals that are representative of the set of RF input signals from the second set of DAUs to a plurality of remote units further comprises sending the set of RF output signals to the plurality of remote units via a central hub.

16. The method of claim 12, wherein the set of RF input signals is identical to the set of RF output signals.

17. The method of claim 12, further comprising capacity shifting.

* * * * *